US012749888B2

(12) United States Patent
Zhou et al.

(10) Patent No.: US 12,749,888 B2
(45) Date of Patent: Sep. 29, 2026

(54) PHOTOVOLTAIC MODULE TURN-OFF CIRCUIT AND PHOTOVOLTAIC DEVICE

(71) Applicant: ALTENERGY POWER SYSTEM INC., Jiaxing (CN)

(72) Inventors: Dongming Zhou, Jiaxing (CN); Yuhao Luo, Jiaxing (CN)

(73) Assignee: ALTENERGY POWER SYSTEM INC., Jiaxing (CN)

(*) Notice: Subject to any disclaimer, the term of this patent is extended or adjusted under 35 U.S.C. 154(b) by 595 days.

(21) Appl. No.: 18/693,908

(22) PCT Filed: Feb. 5, 2021

(86) PCT No.: PCT/CN2021/075390
§ 371 (c)(1),
(2) Date: Mar. 20, 2024

(87) PCT Pub. No.: WO2022/116389
PCT Pub. Date: Jun. 9, 2022

(65) Prior Publication Data

US 2024/0356329 A1 Oct. 24, 2024

(30) Foreign Application Priority Data

Dec. 1, 2020 (CN) ......................... 202011383143.7

(51) Int. Cl.
*H02H 7/20* (2006.01)
*H02H 1/00* (2006.01)
*H02S 40/30* (2014.01)

(52) U.S. Cl.
CPC ............ *H02H 7/20* (2013.01); *H02H 1/0015* (2013.01); *H02S 40/30* (2014.12)

(58) Field of Classification Search
CPC ......... H02H 7/20; H02H 1/0015; H02S 40/30
See application file for complete search history.

(56) References Cited

U.S. PATENT DOCUMENTS

2015/0131187 A1* 5/2015 Krein ...................... H02S 50/00 361/67
2018/0248359 A1 8/2018 Zou et al.
(Continued)

FOREIGN PATENT DOCUMENTS

CN 104167980 A 11/2014
CN 208143083 U 11/2018
(Continued)

OTHER PUBLICATIONS

International Search Report for PCT/CN2021/075390 mailed Aug. 23, 2021, ISA/CN.

(Continued)

*Primary Examiner* — Scott Bauer
(74) *Attorney, Agent, or Firm* — Yue (Robert) Xu; Apex Attorneys at Law, LLP

(57) ABSTRACT

A rapid shutdown device and a photovoltaic device are provided. The rapid shutdown device according to the present disclosure includes a first on-off switching transistor, a voltage module, a first driving module and a control chip. The voltage module adapts voltage outputted by a controlled photovoltaic module to the control chip. Therefore, the rapid shutdown device for a photovoltaic device formed by multiple photovoltaic modules connected in series unnecessitated a high-voltage chip. Instead, a common low-voltage chip is suitable for such photovoltaic device. Further, since an output voltage signal of the low-voltage chip is insufficient to directly drive the first on-off switching transistor connected to the controlled photovoltaic module in series, the first driving module is added to adapt the electric signal sent by the control chip to the first on-off switching transistor.

9 Claims, 10 Drawing Sheets

(56) References Cited

U.S. PATENT DOCUMENTS

| | | | | |
|---|---|---|---|---|
| 2020/0014188 | A1* | 1/2020 | Koga | G05F 1/67 |
| 2020/0067452 | A1* | 2/2020 | Yang | H02J 3/388 |
| 2021/0184458 | A1 | 6/2021 | Wang et al. | |
| 2022/0294389 | A1 | 9/2022 | Luo et al. | |

FOREIGN PATENT DOCUMENTS

| | | | |
|---|---|---|---|
| CN | 109038669 | A | 12/2018 |
| CN | 110289640 | A | 9/2019 |
| CN | 110299727 | A | 10/2019 |
| CN | 110729751 | A | 1/2020 |
| CN | 110784202 | A | 2/2020 |
| CN | 110854919 | A | 2/2020 |
| CN | 111313825 | A | 6/2020 |
| CN | 111555710 | A | 8/2020 |
| CN | 111934352 | A | 11/2020 |
| JP | 2015106882 | A | 6/2015 |

OTHER PUBLICATIONS

The 1st Office Action dated Jun. 29, 2024 for the Chinese Patent Application No. CN202011383143.7. English Translation of the 1st Office Action Provided by http://globaldossier.uspto.gov.

* cited by examiner

PHOTOVOLTAIC MODULE TURN-OFF CIRCUIT AND PHOTOVOLTAIC DEVICE

The present disclosure is a national phase application of PCT international patent application No. PCT/CN2021/075390, filed on Feb. 5, 2021 which claims the priority of Chinese patent application No. 202011383143.7, titled "RAPID SHUTDOWN DEVICE AND PHOTOVOLTAIC DEVICE", filed on Dec. 1, 2020 with the China National Intellectual Property Administration, all of which are incorporated herein by reference in their entireties.

FIELD

The present disclosure relates to the technical field of photovoltaics, and in particular to a rapid shutdown device for a photovoltaic module and a photovoltaic device.

BACKGROUND

Grid-connected photovoltaic systems have advanced rapidly by virtue of renewability and cleanliness of solar energy. In a typical photovoltaic system, multiple photovoltaic modules are connected in series to form a photovoltaic string. The photovoltaic string is connected to an inverter that converts direct current power into alternating current power, which is then inputted into the grid. The photovoltaic modules connected in series generate direct current high-voltage which may result in safety hazards and fire accidents. In view of this, the inverter in the photovoltaic system is provided with anti-arc protection. That is, the inverter stops operating immediately when an arc is detected. However, even if the inverter stops operating, a direct current cable of the photovoltaic modules connected in series may still output a high voltage, resulting in safety hazards. Therefore, the safest approach is to cut off a voltage outputted by each of the photovoltaic modules so as to completely avoid the direct current high-voltage. Usually, each of the photovoltaic modules is connected to a rapid shutdown device in back. Output terminals of the rapid shutdown devices are connected in series to form a branch, and then the branch is connected to an inverter. A rapid shutdown controller switches off transistors in the rapid shutdown devices, to lower voltage across the direct current cable.

Recently, two photovoltaic modules are connected in series to increase the maximum output voltage from 80V to 160V, in order to reduce system costs. This necessitates a control chip that can withstand 160V, resulting in increased difficulties in design and production, high costs, poor performance, and even increased risks.

In view of this, there is in urgent need of a rapid shutdown device that is highly secure and low-cost in the art currently.

SUMMARY

A rapid shutdown device for a photovoltaic module and a photovoltaic device are provided according to the present disclosure. The rapid shutdown device according to the present disclosure is highly secure and low-cost.

The rapid shutdown device according to the present disclosure includes a first on-off switching transistor, a voltage module, a first driving module and a control chip. The voltage module is configured to generate power supply voltage based on output voltage of a controlled photovoltaic module, and supply the power supply voltage to the control chip. The control chip is configured to send a cutoff control signal to the first driving module in response to an arcing signal. The first driving module is configured to process the cutoff control signal, and send the processed cutoff control signal to the first on-off switching transistor. The first on-off switching transistor is configured to connect in series to the controlled photovoltaic module, and is configured to determine, based on the cutoff control signal, to cut off an output terminal of the photovoltaic module from an external circuit.

In an embodiment, a positive terminal of the controlled photovoltaic module is connected to a first terminal of the voltage module and a source of the first on-off switching transistor. A second terminal of the voltage module is connected to an input terminal of the control chip. A first signal output terminal of the control chip is connected to an input terminal of the first driving module, a voltage output terminal of the control chip is connected to a voltage input terminal of the first driving module, and a parallel power supply terminal of the control chip is connected to a negative terminal of the controlled photovoltaic module. A signal terminal of the first driving module is connected to a gate of the switching transistor, a first collecting terminal of the first driving module is connected to the source of the on-off switching transistor, a second collecting terminal of the first driving module is connected to a drain of the on-off switching transistor, and a parallel power supply terminal of the first driving module is connected to the negative terminal of the controlled photovoltaic module.

In an embodiment, the voltage module is a DC-DC converter, an LDO regulator or a buck converter.

In an embodiment, the buck converter includes a first resistor, a second resistor, a third resistor, a first capacitor, a first triode and a first voltage stabilizing diode. The positive terminal of the controlled photovoltaic module is connected to a first terminal of the first resistor and a collector of the first triode. A second terminal of the first resistor is connected to a first terminal of the second resistor, a cathode of the voltage stabilizing diode and a first terminal of the third resistor. A second terminal of the third resistor and an anode of the voltage stabilizing diode are grounded. A second terminal of the second resistor is connected to a base of the first triode. An emitter of the first triode is connected to a first terminal of the first capacitor and the input terminal of the control chip. A second terminal of the first capacitor is grounded.

In an embodiment, the first driving module is a digital isolator, an isolated optical coupler or a photovoltaic driving circuit.

In an embodiment, the photovoltaic driving circuit includes a boost module, a fourth resistor, a fifth resistor, a sixth resistor, a second voltage stabilizing diode, a first diode, a first driving switching transistor and a second driving switching transistor. An input terminal of the boost module is connected to the source of the first on-off switching transistor, a parallel power supply terminal of the boost module is grounded, and an output terminal of the boost module is connected to a first terminal of the fourth resistor. A second terminal of the fourth resistor is connected to the gate of the first on-off switching transistor, a drain of the first driving switching transistor and a cathode of the first diode. An anode of the first diode is connected to an anode of the second voltage stabilizing diode, and a cathode of the second voltage stabilizing diode is connected to the source of the first on-off switching transistor. The voltage output terminal of the control chip is connected to a first terminal of the fifth resistor, a second terminal of the fifth resistor is connected to a drain of the second driving switching transistor and a first terminal of the sixth resistor, a second terminal of the sixth resistor is connected to a gate of the first driving switching transistor, and a source of the first driving switching transistor is grounded. The first signal output terminal of the control chip is connected to a gate of the second driving switching transistor, and a source of the second driving switching transistor is grounded.

In an embodiment, the rapid shutdown device further includes a first bypass switching transistor. A drain of the first bypass switching transistor is connected to the source of the first on-off switching transistor, a source of the first bypass switching transistor is connected to the negative terminal of the controlled photovoltaic module, and a gate of the first bypass switching transistor is connected to a second signal output terminal of the control chip.

In an embodiment, the rapid shutdown device further includes a second driving module, a second bypass switching transistor and a second on-off switching transistor, for a photovoltaic module connected in series to the controlled photovoltaic module. A drain of the second bypass switching transistor is connected to a source of the second on-off switching transistor, a source of the second bypass switching transistor is connected to a negative terminal of the photovoltaic module, and a gate of the second bypass switching transistor is connected to a signal output terminal of the second driving module. A drain of the second on-off switching transistor is connected to a positive terminal of the series-connected photovoltaic module, and a gate of the second on-off switching transistor is connected to a third signal output terminal of the control chip. A voltage input terminal of the second driving module is connected to the voltage output terminal of the control chip, and a signal input terminal of the second driving module is connected to a fourth signal output terminal of the control chip.

In an embodiment, the second driving module includes a seventh resistor, an eighth resistor, a ninth resistor, a tenth resistor, a second triode, a third triode and a third voltage stabilizing diode. A first terminal of the tenth resistor is connected to the voltage output terminal of the control chip and an emitter of the second triode, and a second terminal of the tenth resistor is connected to a first terminal of the seventh resistor and a collector of the third triode. A base of the third triode is connected to the fourth signal output terminal of the control chip, and an emitter of the third triode is grounded. A second terminal of the seventh resistor is connected to a base of the second triode. A collector of the second triode is connected to a first terminal of the eighth resistor. A second terminal of the eighth resistor is connected to the gate of the second bypass switching transistor, a first terminal of the ninth resistor and a cathode of the third voltage stabilizing diode. An anode of the third voltage stabilizing diode is connected to the negative terminal of the photovoltaic module. A second terminal of the ninth resistor is connected to the negative terminal of the photovoltaic module.

A photovoltaic device includes the rapid shutdown device as described above.

The rapid shutdown device according to the present disclosure includes the first on-off switching transistor, the voltage module, the first driving module and the control chip. The voltage module is configured to generate power supply voltage based on output voltage of the photovoltaic module, and supply the power supply voltage to the control chip. The control chip is configured to send a cutoff control signal to the first driving module in response to an arcing signal. The first driving module is configured to process the cutoff control signal, and send the processed cutoff control signal to the first on-off switching transistor. The first on-off switching transistor is connected in series to the photovoltaic module, and is configured to determine, based on the cutoff control signal, to cut off an output terminal of the photovoltaic module from an external circuit.

In the rapid shutdown device according to the present disclosure, the voltage module adapts the output voltage of the controlled photovoltaic module to the control chip. Therefore, the rapid shutdown device for a photovoltaic device formed by multiple photovoltaic modules connected in series unnecessitated the high-voltage chip. Instead, the common low-voltage chip is suitable for the photovoltaic device formed by multiple photovoltaic modules connected in series. Further, since an output voltage signal of the low-voltage chip is insufficient to directly drive the first on-off switching transistor connected to the controlled photovoltaic module in series, the first driving module is added to adapt the electric signal sent by the control chip to the first on-off switching transistor. Therefore, the low-voltage chip is sufficient for a high-voltage photovoltaic device formed by multiple photovoltaic modules connected in series. This solution is low-cost and fails to increase difficulties in design and production. In addition, the photovoltaic device that produces the same beneficial effects is further provided according to the present disclosure.

BRIEF DESCRIPTION OF THE DRAWINGS

In order to more clearly explain technical solutions in the embodiments of the present disclosure or in the conventional technology, the accompanying drawings for describing the embodiments or the conventional technology are briefly described hereinafter. Apparently, the accompanying drawings in the following description are only embodiments of the present disclosure. Other drawings may be obtained for those of ordinary skill in the art based on the provided drawings without any creative efforts.

DETAILED DESCRIPTION OF THE EMBODIMENTS

Figure 1:
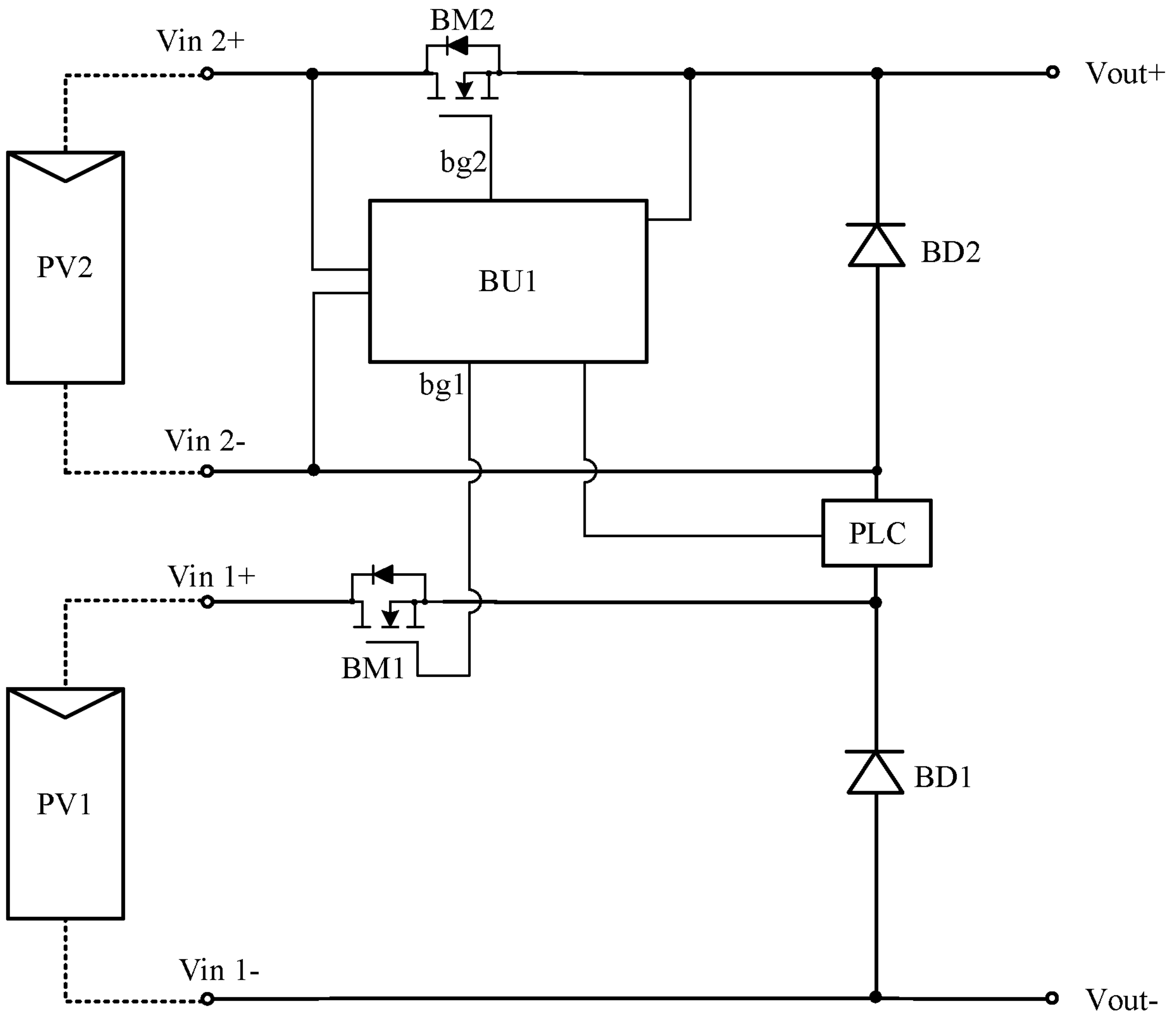
FIG. 1 is a circuit diagram of a rapid shutdown device for a photovoltaic module according to the conventional technology.

As shown in FIG. 1, a rapid shutdown device according to the conventional technology generally includes main switching transistors BM1 and BM2, a control chip BU1, a PLC communication module and bypass diodes BD1 and BD2. An input terminal of BUI is connected to one PV2, and receives voltage less than or equal to 80V from one module. BU1 as a rapid shutdown chip provides various functions, for example, outputting bg1 and bg2 to drive the switching transistors BM1 and BM2 respectively. BU1 contributes to the output voltage Vout+, that is, outputs low voltage and a small driving current when the switching transistors are off. BU1 is also capable of backflow current detection and control, over-temperature protection and bypass MOS switching control. All input and output pins of BU1 should withstand the inputted voltage.

Figure 2:
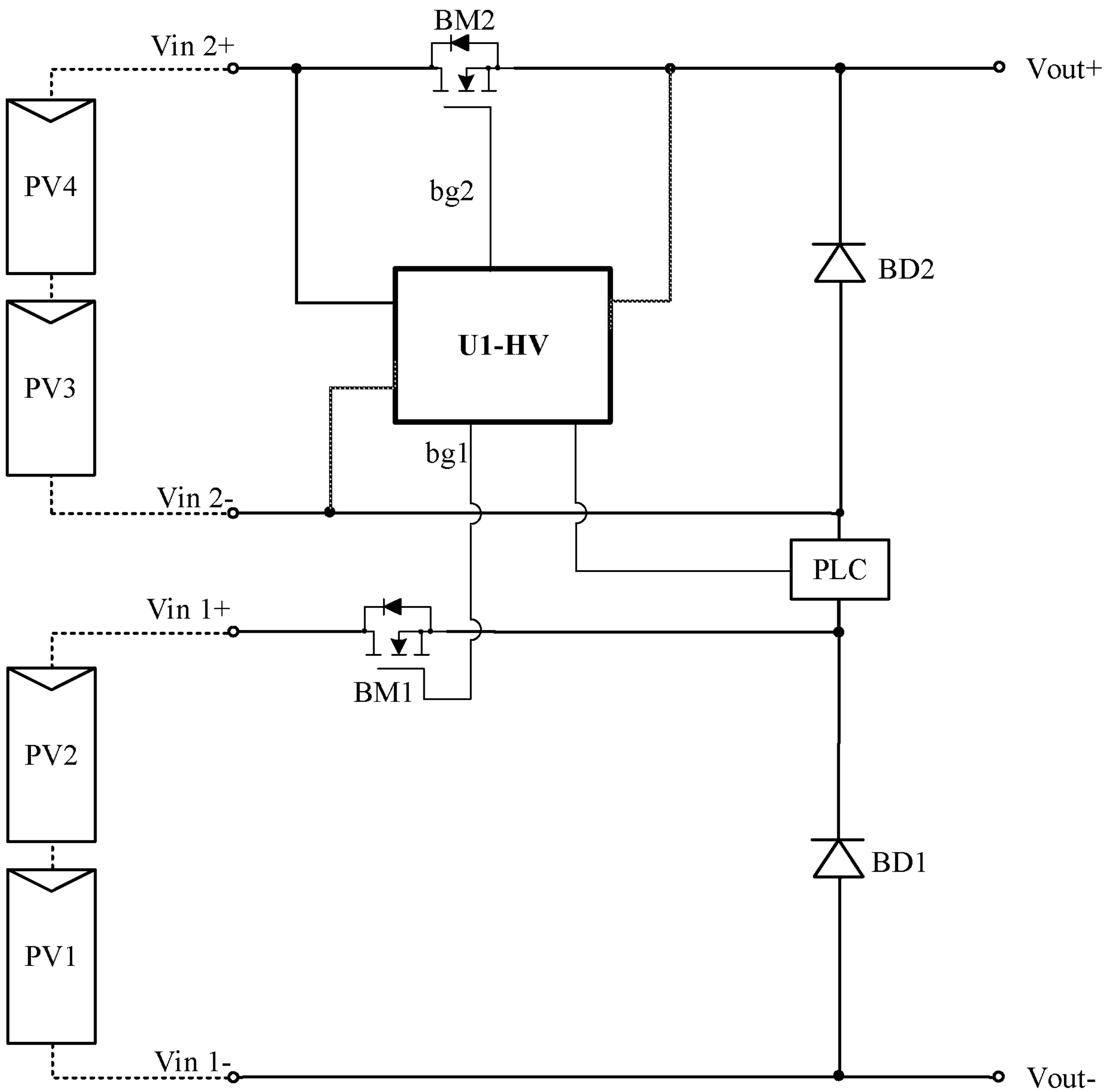
FIG. 2 is a circuit diagram of another rapid shut down device according to the conventional technology.

Recently, two photovoltaic modules are connected in series to increase the maximum output voltage from 80V to 160V, in order to reduce system costs. In view of this, a rapid shutdown device includes BU1-HV which can withstand high voltage of 160V, instead of BU1, as shown in FIG. 2. This results in increased difficulties in design and production, high costs, poor performance, and even increased risks. However, the rapid shutdown device according to the present disclosure is highly secure and low-cost.

The present disclosure is described in further detail in conjunction with the accompanying drawings and by embodiments, so that those skilled in the art can better understand the technical solutions according to the present disclosure. Apparently, the described embodiments are only part rather than all of the embodiments of the present disclosure. All other embodiments obtained by those skilled in the art based on the embodiments of the present disclosure without any creative work should fall within the protection scope of the present disclosure.

Figure 3:
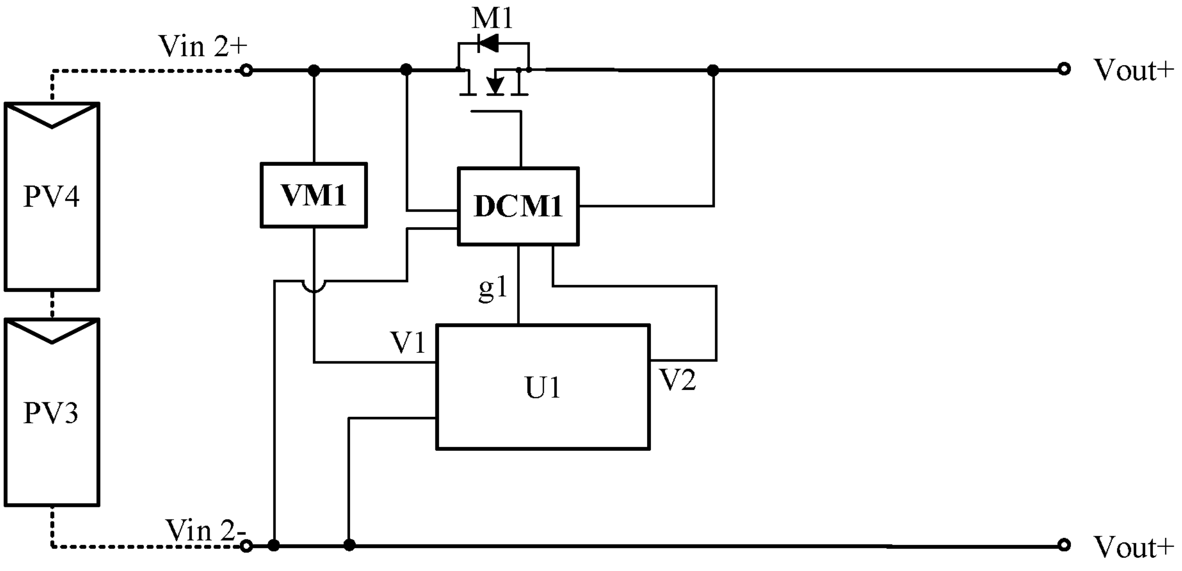
FIG. 3 is a schematic structural diagram of a rapid shutdown device according to an embodiment of the present disclosure.

A rapid shutdown device for a photovoltaic module is provided according to the present disclosure. As shown in FIG. 3, the rapid shutdown device includes a first on-off switching transistor M1, a voltage module VM1, a first driving module DCM1 and a control chip U1.

The voltage module VM1 is configured to generate power supply voltage based on output voltage of the photovoltaic module, and supply the power supply voltage to the control chip U1.

The control chip U1 is configured to send a cutoff control signal to the first driving module DCM1 in response to an arcing signal.

The first driving module DCM1 is configured to process the cutoff control signal, and send the processed cutoff control signal to the first on-off switching transistor M1.

The first on-off switching transistor M1 is connected in series to the photovoltaic module, and is configured to determine, based on the cutoff control signal, to cut off an output terminal of the photovoltaic module from an external circuit.

Since the control chip U1 is connected to the controlled photovoltaic module through the voltage module VM1 and the first driving module DCM1, only the voltage module VM1 and the first driving module DCM1 adapt to the variable voltage, without replacing the control chip U1.

FIG. 3 is a circuit diagram showing the rapid shutdown device. A positive terminal of the controlled photovoltaic module is connected to a first terminal of the voltage module VM1 and a drain of the first on-off switching transistor M1.

A second terminal of the voltage module VM1 is connected to an input terminal of the control chip U1.

A first signal output terminal of the control chip U1 is connected to an input terminal of the first driving module DCM1. A voltage output terminal of the control chip U1 is connected to a voltage input terminal of the first driving module DCM1. A parallel power supply terminal of the control chip U1 is connected to a negative terminal of the controlled photovoltaic module.

A signal terminal of the first driving module DCM1 is connected to a gate of the on-off switching transistor. A first collecting terminal of the first driving module DCM1 is connected to the source of the on-off switching transistor. A second collecting terminal of the first driving module DCM1 is connected to a drain of the on-off switching transistor. A parallel power supply terminal of the first driving module DCM1 is connected to the negative terminal of the controlled photovoltaic module.

It should be noted FIG. 3 shows two modules PV3 and PV4 connected in series, as the controlled photovoltaic module.

For ease of expression, g1 represents the first signal output terminal of the control chip U1, V1 represents a voltage signal received by the control chip U1 from the voltage module VM1, and V2 represents an electric signal outputted by the control chip U1 through the voltage output terminal. Vout+ and Vout− in the drawings represent output terminals of the controlled photovoltaic module connected to the external circuit.

In some embodiments, the voltage module VM1 is a DC-DC converter, an LDO regulator or a buck converter.

In some embodiments, the first driving module DCM1 is a digital isolator, an isolated optical coupler or a photovoltaic driving circuit.

Figure 4:
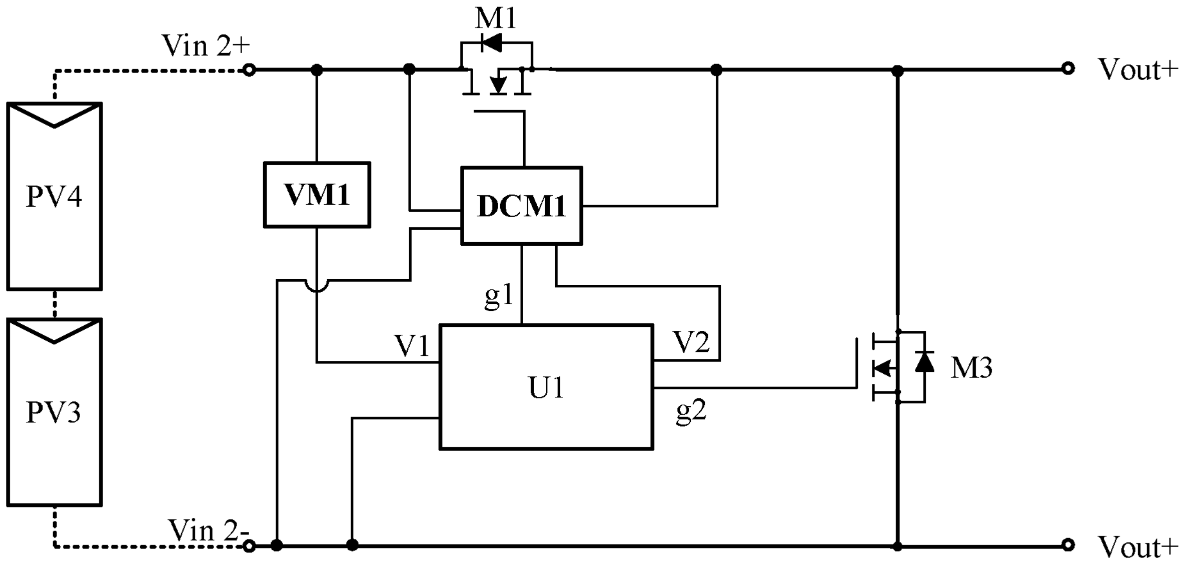
FIG. 4 is a schematic structural diagram of the rapid shutdown device according to another embodiment of the present disclosure.

In some embodiments, the rapid shutdown device further includes a first bypass switching transistor M3 as shown in FIG. 4.

A drain of the first bypass switching transistor M3 is connected to the source of the first on-off switching transistor M1. A source of the first bypass switching transistor M3 is connected to the negative terminal of the controlled photovoltaic module. A gate of the first bypass switching transistor M3 is connected to a second signal output terminal of the control chip U1.

The rapid shutdown device including the first bypass switching transistor M3 can protect the system better than the conventional rapid shutdown device including the bypass diode instead of the bypass switching transistor, and therefore the system can operate stably. For ease of expression, g2 represents the second signal output terminal of the control chip U1.

Figure 5:
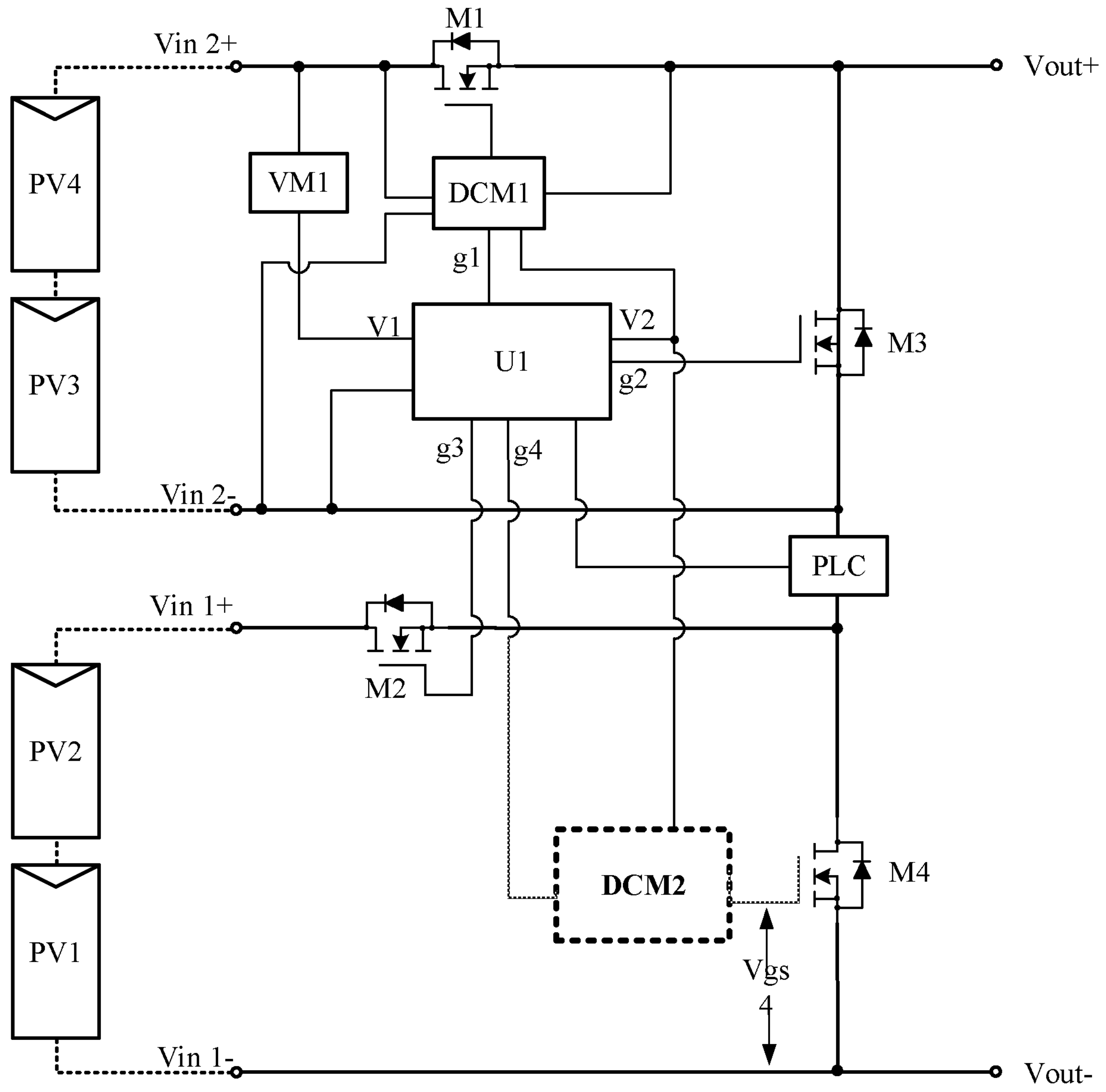
FIG. 5 is a schematic structural diagram of the rapid shutdown device according to another embodiment of the present disclosure.

In some embodiments, the rapid shutdown device further includes a second driving module DCM2, a second bypass switching transistor M4 and a second on-off switching transistor M2 corresponding to a photovoltaic module that is connected in series to the controlled photovoltaic module, as shown in FIG. 5.

A drain of the second bypass switching transistor M4 is connected to a source of the second on-off switching transistor M2. A source of the second bypass switching transistor M4 is connected to a negative terminal of the photovoltaic module that is connected in series to the controlled photovoltaic module. A gate of the second bypass switching transistor M4 is connected to a signal output terminal of the second driving module DCM2.

A drain of the second on-off switching transistor M2 is connected to a positive terminal of the corresponding photovoltaic module. A gate of the second on-off switching transistor M2 is connected to a third signal output terminal of the control chip U1.

A voltage input terminal of the second driving module DCM2 is connected to the voltage output terminal of the control chip U1. A signal input terminal of the second driving module DCM2 is connected to a fourth signal output terminal of the control chip U1.

Therefore, the control chip U1 controls the second bypass switching transistor M4 of the photovoltaic module that is connected in series to the controlled photovoltaic module. Since there is a voltage drop between the controlled photovoltaic module and the photovoltaic module that is connected in series to the controlled photovoltaic module. The second driving module DCM2 is added between the second bypass switching transistor M4 and the control chip U1 to adapt the output voltage of the control chip U1 to the second bypass switching transistor M4. Therefore, the low-voltage control chip can control the photovoltaic module that outputs high voltage.

For ease of expression, g3 represents the third signal output terminal of the control chip U1, and g4 represents the fourth signal output terminal of the control chip U1.

Figure 9:
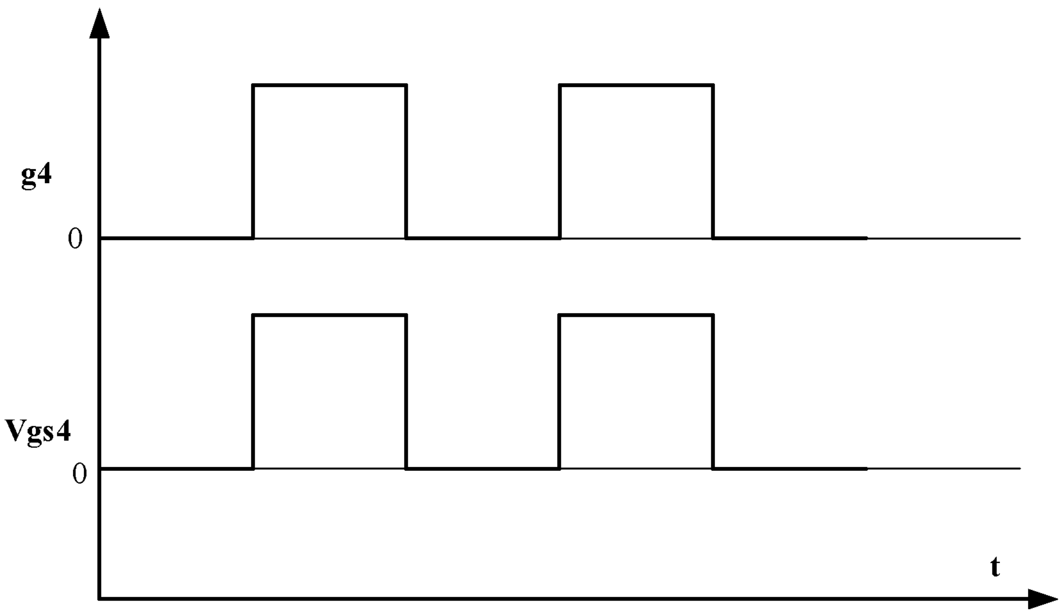
FIG. 9 is a schematic diagram showing a control signal sent by a control chip to a second driving module and the control signal processed by the second driving module in the rapid shutdown device according to an embodiment of the present disclosure.

FIG. 9 is a schematic diagram showing a control signal g4 sent by the control chip U1 to the second driving module DCM2 and the control signal Vg4 processed by the second driving module DCM2 according to an embodiment of the present disclosure. g4 and Vg4 are identical in phase while different in amplitude.

It should be noted that the switching transistor according to the present disclosure may be an MOS transistor as shown in the drawings, or another similar device, such as an IGBT, a thyristor, a triode and a relay. Names of electrodes are adapted to the other device. For example, in a case of triode, the “gate” herein should be changed to a “base”, the “drain” should be changed to a “collector”, and the “source” should be changed to an “emitter”.

Figure 6:
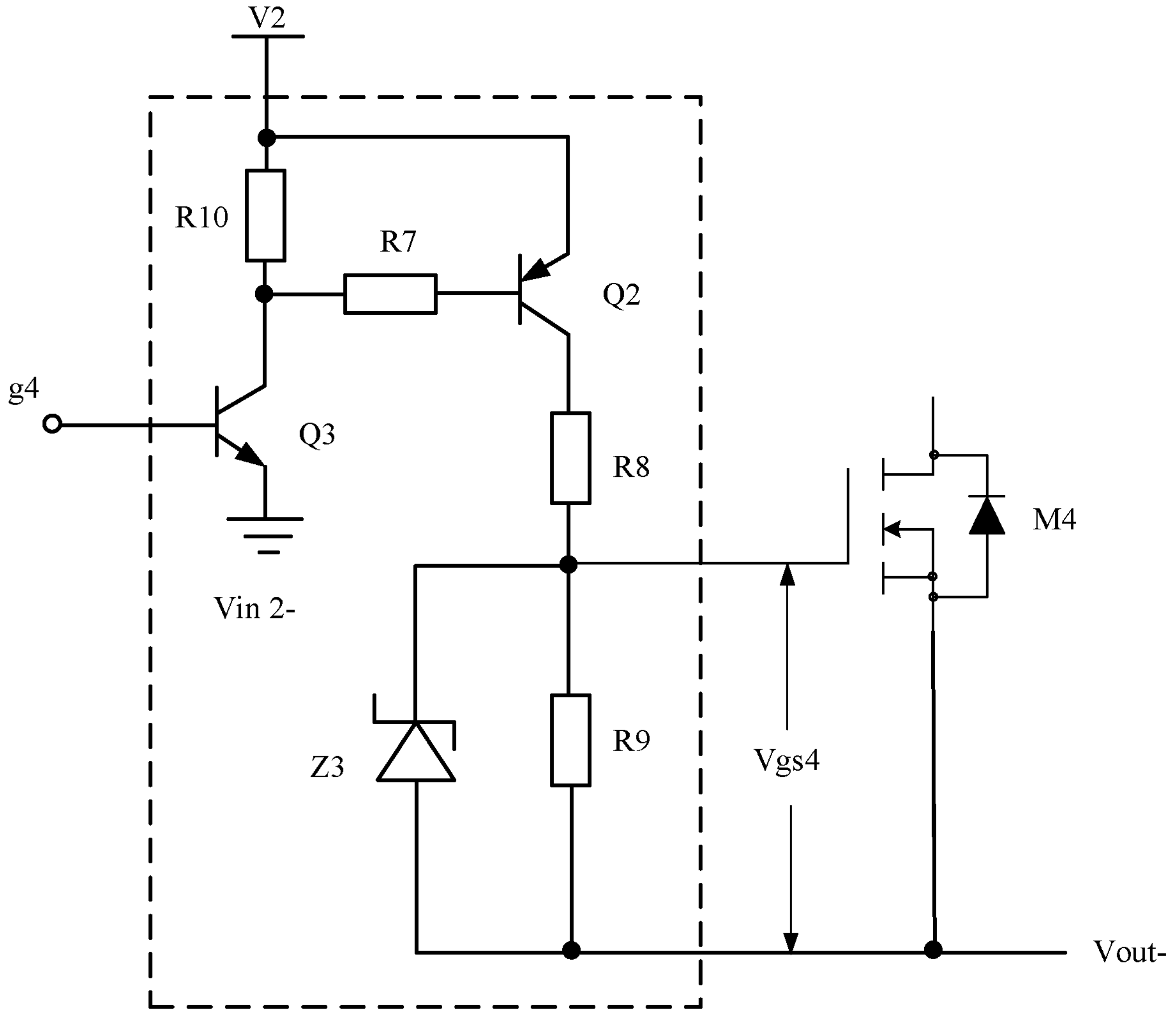
FIG. 6 is a partial schematic structural diagram of the rapid shutdown device according to an embodiment of the present disclosure.

FIG. 6 shows the second driving module DCM2 in detail. The second driving module DCM2 includes a seventh resistor R7, an eighth resistor R8, a ninth resistor R9, a tenth resistor R10, a second triode Q2, a third triode Q3 and a third voltage stabilizing diode Z3.

A first terminal of the tenth resistor R10 is connected to the voltage output terminal of the control chip U1 and an emitter of the second triode Q2. A second terminal of the tenth resistor R10 is connected to a first terminal of the seventh resistor R7 and a collector of the third triode Q3.

A base of the third triode Q3 is connected to the fourth signal output terminal of the control chip U1. An emitter of the third triode Q3 is grounded.

A second terminal of the seventh resistor R7 is connected to a base of the second triode Q2.

A collector of the second triode Q2 is connected to a first terminal of the eighth resistor R8.

A second terminal of the eighth resistor R8 is connected to the gate of the second bypass switching transistor M4, a first terminal of the ninth resistor R9 and a cathode of the third voltage stabilizing diode Z3.

An anode of the third voltage stabilizing diode Z3 is connected to the negative pole of the series-connected photovoltaic module.

A second terminal of the ninth resistor R9 is connected to the negative terminal of the photovoltaic module that is connected in series to the controlled photovoltaic module.

The second driving module DCM2 described above serves as a controllable current source, and therefore no additional power supply circuit is provided for the second bypass switching transistor M4. Therefore, the rapid shutdown device is simple is structure, facilitating the integration of the photovoltaic device. Further, the photovoltaic device is low-cost.

FIG. 6 shows two modules PV1 and PV2 in the photovoltaic module that is connected in series to the controlled photovoltaic module. Vgs4 represents a voltage between the gate of the second bypass switching transistor M4 and the negative terminal of the photovoltaic module.

The rapid shutdown device according to the present disclosure includes the first on-off switching transistor M1, the voltage module VM1, the first driving module DCM1 and the control chip U1. The voltage module VM1 is configured to generate power supply voltage based on output voltage of the photovoltaic module, and supply the power supply voltage to the control chip U1. The control chip U1 is configured to send a cutoff control signal to the first driving module DCM1 in response to an arcing signal. The first driving module DCM1 is configured to process the cutoff control signal, and send the processed cutoff control signal to the first on-off switching transistor M1. The first on-off switching transistor M1 is connected in series to the photovoltaic module, and is configured to determine, based on the cutoff control signal, to cut off an output terminal of the photovoltaic module from an external circuit. In the rapid shutdown device according to the present disclosure, the voltage module VM1 adapts the output voltage of the controlled photovoltaic module to the control chip U1. Therefore, the rapid shutdown device for a photovoltaic device formed by multiple photovoltaic modules connected in series unnecessitated the high-voltage chip. Instead, the common low-voltage chip is suitable for the photovoltaic device formed by multiple photovoltaic modules connected in series. Further, since an output voltage signal of the low-voltage chip is insufficient to directly drive the first on-off switching transistor M1 connected to the controlled photovoltaic module in series, the first driving module DCM1 is added to adapt the electric signal sent by the control chip U1 to the first on-off switching transistor M1. Therefore, the low-voltage chip is sufficient for a high-voltage photovoltaic device formed by multiple photovoltaic modules connected in series. This solution is low-cost and fails to increase difficulties in design and production.

Figure 7:
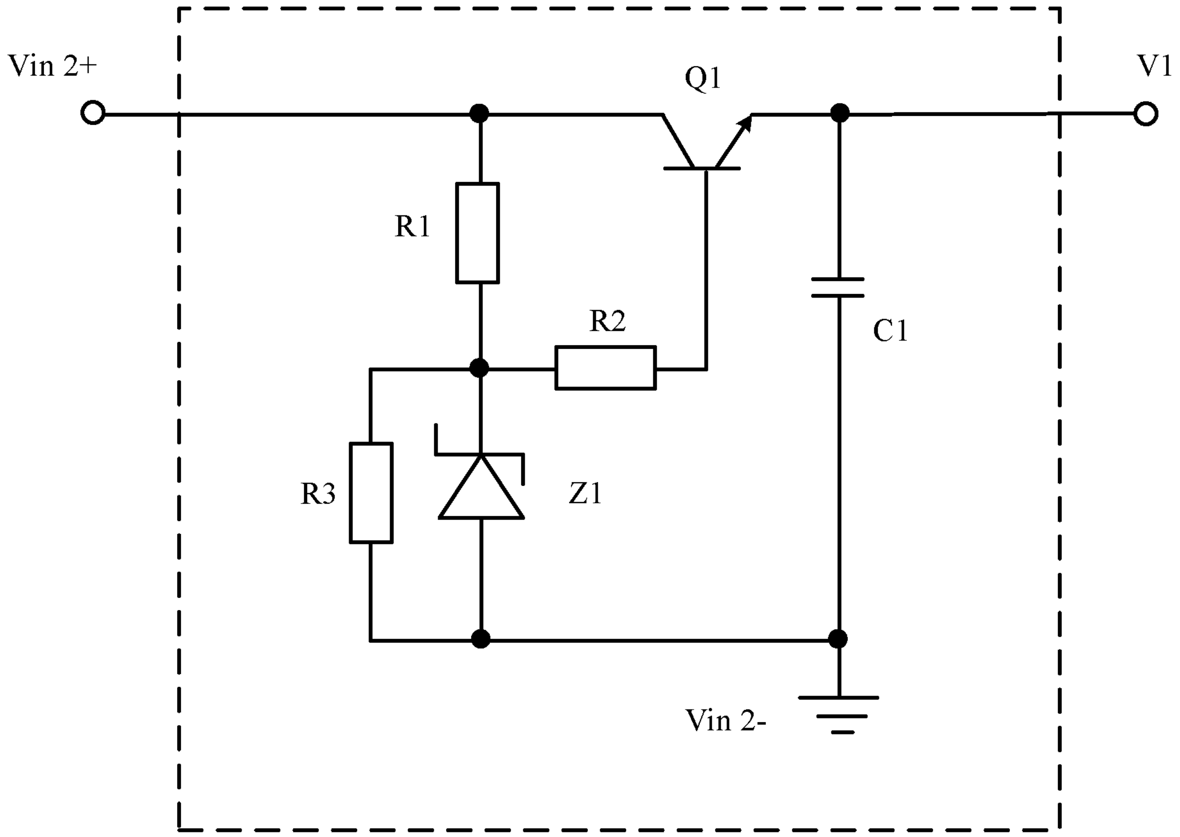
FIG. 7 is a partial schematic structural diagram of the rapid shutdown device according to another embodiment of the present disclosure.

The buck converter is described in further detail according to a second embodiment, based on the first embodiment. The buck converter serves as the voltage module VM1 herein. As shown in FIG. 7, the buck converter includes a first resistor R1, a second resistor R2, a third resistor R3, a first capacitor C1, a first triode Q1 and a first voltage stabilizing diode Z1.

The positive terminal of the controlled photovoltaic module is connected to a first terminal of the first resistor R1 and a collector of the first triode Q1.

A second terminal of the first resistor R1 is connected to a first terminal of the second resistor R2, a cathode of the voltage stabilizing diode and a first terminal of the third resistor R3.

A second terminal of the third resistor R3 is grounded. An anode of the voltage stabilizing diode is grounded.

A second terminal of the second resistor R2 is connected to a base of the first triode Q1.

An emitter of the first triode Q1 is connected to a first terminal of the first capacitor C1 and the input terminal of the control chip U1.

A second terminal of the first capacitor C1 is grounded.

The voltage module VM1 that is the buck converter is described in detail herein, and is provided no external power supply. Instead, the controlled photovoltaic module directly supplies power to the voltage module VM1. Therefore, the system is simple in structure and low-cost, and further can operate stably. In other embodiments, the DC-DC converter or the LDO regulator serves as the voltage module VM1.

Figure 8:
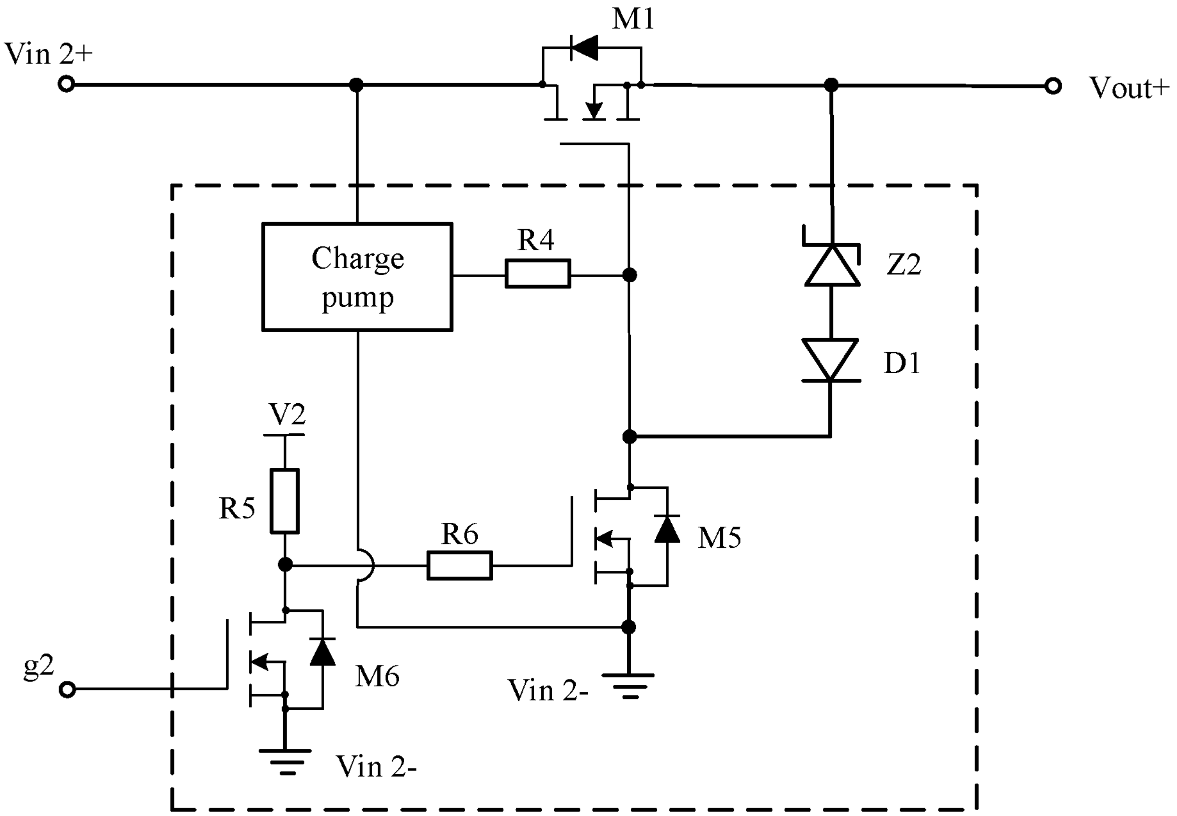
FIG. 8 is a partial schematic structural diagram of the rapid shutdown device according to another embodiment of the present disclosure.

Based on the second embodiment, the photovoltaic driving circuit serving as the first driving module DCM1 is further describe in detail according to a third embodiment. As shown in FIG. 8, the photovoltaic driving circuit includes a boost module, a fourth resistor R4, a fifth resistor R5, a sixth resistor R6, a second voltage stabilizing diode Z2, a first diode D1, a first driving switching transistor M5 and a second driving switching transistor M6.

An input terminal of the boost module is connected to the drain of the first on-off switching transistor M1. A parallel power supply terminal of the boost module is grounded. An output terminal of the boost module is connected to a first terminal of the fourth resistor R4.

A second terminal of the fourth resistor R4 is connected to the gate of the first on-off switching transistor M1, a drain of the first driving switching transistor M5 and a cathode of the first diode D1.

An anode of the first diode DI is connected to an anode of the second voltage stabilizing diode Z2. A cathode of the second voltage stabilizing diode Z2 is connected to the source of the first on-off switching transistor M1.

The voltage output terminal of the control chip U1 is connected to a first terminal of the fifth resistor R5. A second terminal of the fifth resistor R5 is connected to a drain of the second driving switching transistor M6 and a first terminal of the sixth resistor R6. A second terminal of the sixth resistor R6 is connected to a gate of the first driving switching transistor M5. A source of the first driving switching transistor M5 is grounded.

The first signal output terminal of the control chip U1 is connected to a gate of the second driving switching transistor M6. A source of the second driving switching transistor M6 is grounded.

The first driving module DCM1 that is the photovoltaic driving circuit is described in detail herein and is provided no external power supply. Instead, the controlled photovoltaic module directly supplies power to the first driving module DCM1. Therefore, the system is simple in structure and low-cost, and further can operate stably.

Figure 10:
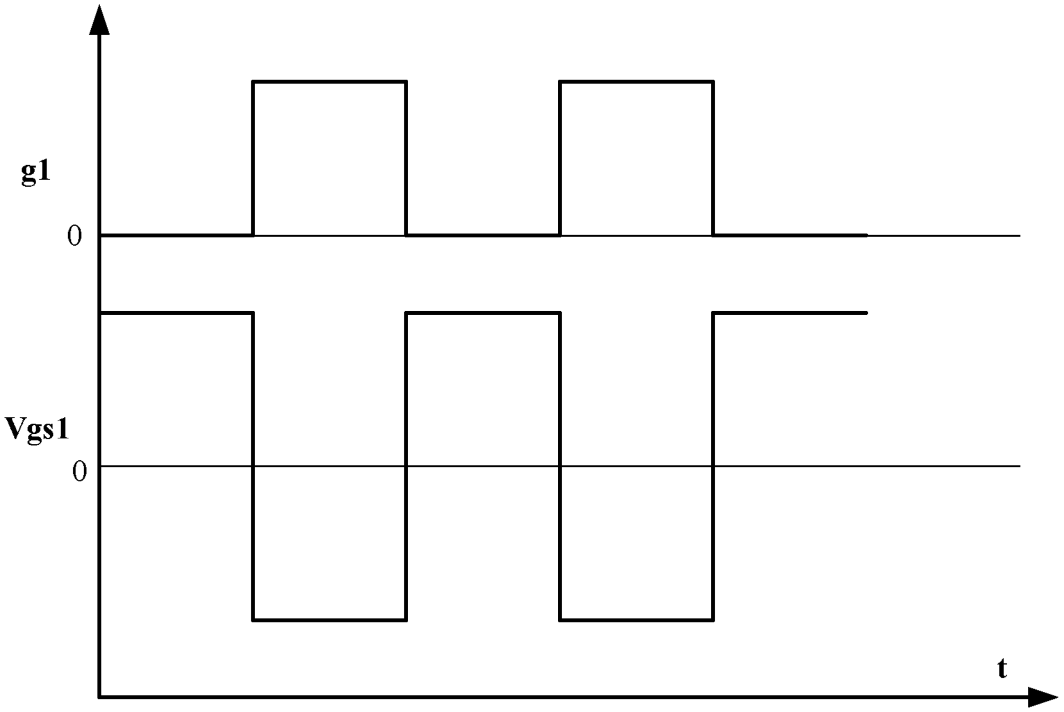
FIG. 10 is a schematic diagram showing a cutoff control signal of the rapid shutdown device before and after processed according to an embodiment of the present disclosure.

The Charge pump shown in FIG. 8 serves as the boost module herein. In other embodiments, a capacitor pump or another boost circuit serves as the boost module. FIG. 10 is a schematic diagram showing the cutoff control signal before and after processed according to an embodiment. g2 control pin of U1 that outputs a low level can drive the MOS transistor M1 of low level by virtue of isolation of M6 and M5. Z2 and D1 form a driving protection circuit for M5. R4 is a current limiting resistor. Vgs1 represents the threshold voltage of the MOS transistor M1. In some embodiments, the first driving module DCM1 is one of a digital isolator and an isolated optical coupler which necessitate an additional power supply, resulting in relatively high costs.

In some embodiments, the first driving module DCM1 is a digital isolator or an isolated optical coupler, instead of the photovoltaic driving circuit.

A photovoltaic device that produces the same beneficial effects is further provided according to the present disclosure. The photovoltaic device includes the rapid shutdown device as described above. The rapid shutdown device according to the present disclosure includes a first on-off switching transistor M1, a voltage module VM1, a first driving module DCM1 and a control chip U1. The voltage module VM1 is configured to generate power supply voltage based on output voltage of the photovoltaic module, and supply the power supply voltage to the control chip U1. The control chip U1 is configured to send a cutoff control signal to the first driving module DCM1 in response to an arcing signal. The first driving module DCM1 is configured to process the cutoff control signal, and send the processed cutoff control signal to the first on-off switching transistor M1. The first on-off switching transistor M1 is connected in series to the photovoltaic module, and is configured to determine, based on the cutoff control signal, to cut off an output terminal of the photovoltaic module from an external circuit. In the rapid shutdown device according to the present disclosure, the voltage module VM1 adapts the output voltage of the controlled photovoltaic module to the control chip U1. Therefore, the rapid shutdown device for a photovoltaic device formed by multiple photovoltaic modules connected in series unnecessitated the high-voltage chip. Instead, the common low-voltage chip is suitable for the photovoltaic device formed by multiple photovoltaic modules connected in series. Further, since an output voltage signal of the low-voltage chip is insufficient to directly drive the first on-off switching transistor M1 connected to the controlled photovoltaic module in series, the first driving module DCM1 is added to adapt the electric signal sent by the control chip U1 to the first on-off switching transistor M1. Therefore, the low-voltage chip is sufficient for a high-voltage photovoltaic device formed by multiple photovoltaic modules connected in series. This solution is low-cost and fails to increase difficulties in design and production.

The embodiments in the specification are described in a progressive manner, and each of the embodiments focuses on its differences from other embodiments. The same or similar parts among the embodiments may be referred to each other. Since the device disclosed in the embodiments corresponds to the method disclosed in the embodiments, the description for the device is simple, and reference may be made to the method embodiments for the relevant parts.

It should be noted that the relationship terms in the specification such as first and second are only used herein to distinguish one entity or operation from another, rather than to necessitate or imply that the actual relationship or order exists between the entities or operations. Moreover, terms such as "comprise", "include", or any other variation thereof are intended to cover non-exclusive inclusion, such that a process, method, article, or device that includes a series of elements includes not only the series of elements, but also other elements not explicitly listed, or also includes elements inherent in such process, method, article, or device. Unless expressively limited otherwise, the element defined by the statement "including a . . . " does not exclude the case that other same elements may exist in the process, method, article or device including the element.

The rapid shutdown device and the photovoltaic device according to the present disclosure are described in detail above. Specific examples are used in this specification to illustrate the principle and implementation of the present disclosure. The description of the above embodiments is only intended for understanding of the method and core concept of the present disclosure. It should be noted that several improvements and modifications may be made to the present disclosure by those skilled in the art without departing from the principles of the present disclosure, which also fall within the scope of protection of the claims of the present disclosure.

The invention claimed is:

1. A rapid shutdown device, comprising:

a first on-off switching transistor;

a voltage module;

a first driving module; and a control chip, wherein the voltage module is configured to generate power supply voltage based on output voltage of a controlled photovoltaic module, and supply the power supply voltage to the control chip;

the control chip is configured to send a cutoff control signal to the first driving module in response to an arcing signal;

the first driving module is configured to process the cutoff control signal, and send the processed cutoff control signal to the first on-off switching transistor; and the first on-off switching transistor is configured to connect in series to the controlled photovoltaic module, and is configured to determine, based on the cutoff control signal, to cut off an output terminal of the photovoltaic module from an external circuit;

wherein a positive terminal of the controlled photovoltaic module is connected to a first terminal of the voltage module and a drain of the first on-off switching transistor;

wherein a second terminal of the voltage module is connected to an input terminal of the control chip;

wherein a first signal output terminal of the control chip is connected to an input terminal of the first driving module, a voltage output terminal of the control chip is connected to a voltage input terminal of the first driving module, and a parallel power supply terminal of the control chip is connected to a negative terminal of the controlled photovoltaic module; and wherein a signal terminal of the first driving module is connected to a gate of the switching transistor, a first collecting terminal of the first driving module is connected to a source of the first on-off switching transistor, a second collecting terminal of the first driving module is connected to a drain of the first on-off switching transistor, and a parallel power supply terminal of the first driving module is connected to the negative terminal of the controlled photovoltaic module.

2. The rapid shutdown device according to claim 1, wherein the voltage module is a DC-DC converter, an LDO regulator or a buck converter.

3. The rapid shutdown device according to claim 2, wherein the buck converter comprises:

a first resistor;

a second resistor;

a third resistor;

a first capacitor;

a first triode; and a first voltage stabilizing diode, wherein the positive terminal of the controlled photovoltaic module is connected to a first terminal of the first resistor and a collector of the first triode;

a second terminal of the first resistor is connected to a first terminal of the second resistor, a cathode of the voltage stabilizing diode and a first terminal of the third resistor;

a second terminal of the third resistor and an anode of the voltage stabilizing diode are grounded;

a second terminal of the second resistor is connected to a base of the first triode;

an emitter of the first triode is connected to a first terminal of the first capacitor and the input terminal of the control chip; and a second terminal of the first capacitor is grounded.

4. The rapid shutdown device according to claim 1, wherein the first driving module is a digital isolator, an isolated optical coupler or a photovoltaic driving circuit.

5. The rapid shutdown device according to claim 4, wherein the photovoltaic driving circuit comprises:

a boost module;

a fourth resistor;

a fifth resistor;

a sixth resistor;

a second voltage stabilizing diode;

a first diode;

a first driving switching transistor; and a second driving switching transistor, wherein an input terminal of the boost module is connected to the drain of the first on-off switching transistor, a parallel power supply terminal of the boost module is grounded, and an output terminal of the boost module is connected to a first terminal of the fourth resistor;

a second terminal of the fourth resistor is connected to the gate of the first on-off switching transistor, a drain of the first driving switching transistor and a cathode of the first diode;

an anode of the first diode is connected to an anode of the second voltage stabilizing diode, and a cathode of the second voltage stabilizing diode is connected to the source of the first on-off switching transistor;

the voltage output terminal of the control chip is connected to a first terminal of the fifth resistor, a second terminal of the fifth resistor is connected to a drain of the second driving switching transistor and a first terminal of the sixth resistor, a second terminal of the sixth resistor is connected to a gate of the first driving switching transistor, and a source of the first driving switching transistor is grounded; and the first signal output terminal of the control chip is connected to a gate of the second driving switching transistor, and a source of the second driving switching transistor is grounded.

6. The rapid shutdown device according to claim 1, further comprising:

a first bypass switching transistor, wherein a drain of the first bypass switching transistor is connected to the source of the first on-off switching transistor, a source of the first bypass switching transistor is connected to the negative terminal of the controlled photovoltaic module, and a gate of the first bypass switching transistor is connected to a second signal output terminal of the control chip.

7. The rapid shutdown device according to claim 1, further comprising:

a second driving module, a second bypass switching transistor and a second on-off switching transistor, for a photovoltaic module connected in series to the controlled photovoltaic module, wherein a drain of the second bypass switching transistor is connected to a source of the second on-off switching transistor, a source of the second bypass switching transistor is connected to a negative terminal of the photovoltaic module, and a gate of the second bypass switching transistor is connected to a signal output terminal of the second driving module;

a drain of the second on-off switching transistor is connected to a positive terminal of the series-connected photovoltaic module, and a gate of the second on-off switching transistor is connected to a third signal output terminal of the control chip; and a voltage input terminal of the second driving module is connected to the voltage output terminal of the control chip, and a signal input terminal of the second driving module is connected to a fourth signal output terminal of the control chip.

8. The rapid shutdown device according to claim 7, wherein the second driving module comprises:

a seventh resistor;

an eighth resistor;

a ninth resistor;

a tenth resistor;

a second triode;

a third triode; and a third voltage stabilizing diode, wherein a first terminal of the tenth resistor is connected to the voltage output terminal of the control chip and an emitter of the second triode, and a second terminal of the tenth resistor is connected to a first terminal of the seventh resistor and a collector of the third triode;

a base of the third triode is connected to the fourth signal output terminal of the control chip, and an emitter of the third triode is grounded;

a second terminal of the seventh resistor is connected to a base of the second triode;

a collector of the second triode is connected to a first terminal of the eighth resistor;

a second terminal of the eighth resistor is connected to the gate of the second bypass switching transistor, a first terminal of the ninth resistor and a cathode of the third voltage stabilizing diode;

an anode of the third voltage stabilizing diode is connected to the negative terminal of the photovoltaic module; and a second terminal of the ninth resistor is connected to the negative terminal of the photovoltaic module.

9. A photovoltaic device, comprising:

a rapid shutdown device, wherein the rapid shutdown device comprises:

a first on-off switching transistor;

a voltage module;

a first driving module; and a control chip, wherein the voltage module is configured to generate power supply voltage based on output voltage of a controlled photovoltaic module, and supply the power supply voltage to the control chip;

the control chip is configured to send a cutoff control signal to the first driving module in response to an arcing signal;

the first driving module is configured to process the cutoff control signal, and send the processed cutoff control signal to the first on-off switching transistor; and the first on-off switching transistor is configured to connect in series to the controlled photovoltaic module, and is configured to determine, based on the cutoff control signal, to cut off an output terminal of the photovoltaic module from an external circuit;

wherein a positive terminal of the controlled photovoltaic module is connected to a first terminal of the voltage module and a drain of the first on-off switching transistor;

wherein a second terminal of the voltage module is connected to an input terminal of the control chip;

wherein a first signal output terminal of the control chip is connected to an input terminal of the first driving module, a voltage output terminal of the control chip is connected to a voltage input terminal of the first driving module, and a parallel power supply terminal of the control chip is connected to a negative terminal of the controlled photovoltaic module; and wherein a signal terminal of the first driving module is connected to a gate of the switching transistor, a first collecting terminal of the first driving module is connected to a source of the first on-off switching transistor, a second collecting terminal of the first driving module is connected to a drain of the first on-off switching transistor, and a parallel power supply terminal of the first driving module is connected to the negative terminal of the controlled photovoltaic module.

* * * * *